(12) United States Patent
Liu et al.

(10) Patent No.: US 7,792,936 B2
(45) Date of Patent: Sep. 7, 2010

(54) METHOD AND APPARATUS FOR VIRTUALIZING NETWORK RESOURCES

(75) Inventors: Zhen Liu, Tarrytown, NY (US); George V. Popescu, Stamford, CT (US); Sambit Sahu, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 10/726,002

(22) Filed: Dec. 1, 2003

(65) Prior Publication Data

US 2005/0120088 A1 Jun. 2, 2005

(51) Int. Cl.
 *G06F 15/173* (2006.01)
(52) U.S. Cl. ........................... 709/223; 709/238
(58) Field of Classification Search ............ 709/223, 709/226, 238
 See application file for complete search history.

(56) References Cited

U.S. PATENT DOCUMENTS

| 5,764,750 A * | 6/1998 | Chau et al. ............... 379/229 |
| 2001/0047477 A1 * | 11/2001 | Chiang ........................ 713/170 |
| 2003/0101278 A1 * | 5/2003 | Garcia-Luna-Aceves et al. . 709/240 |
| 2003/0217128 A1 * | 11/2003 | Yanosy ....................... 709/223 |
| 2004/0240462 A1 * | 12/2004 | T V et al. .................... 370/432 |

FOREIGN PATENT DOCUMENTS

CN 1239252 12/1999

OTHER PUBLICATIONS

Aggarwal, et al., "Finding Generalized Projected Clusters in High Dimensional Spaces," SIGMOD-00, 2000.
Banavar, et al., "An Efficient Multicast Protocol for Content-Based Publish-Subscribe Systems," Intl Conf on Distributed Computing Systems, (ICDSC '99) Austin, TX, May 1999, 262-272.
Banerjee et al., "Scalable Application Layer Multicast," ACM Sigcomm, Aug. 2002.
Chang, et al., "Scalable and Efficient Update Dissemination for Interactive Distributed Applications," ICDCS 2002, Jul. 2002, Vienna 1-9.
Chu et al., "Enabling Conferencing Applications on the Internet using an Overlay Multicast Architecture", Proceedings of ACM SIGCOMM, San Diego, CA, Aug. 2001.
Chu et al., "A Case for End System Multicast", Proceedings of ACM Sigmetrics, Santa Clara,CA, Jun. 2000, pp. 1-12.

(Continued)

*Primary Examiner*—Larry D Donaghue
*Assistant Examiner*—Brian J Gillis

(57) ABSTRACT

A method and apparatus for managing communications for collaborative applications. Middleware uses, network, application, and middleware resource information together with user information to facilitate communications between the application resources and the users via a hierarchical control structure that implements a communication overlay tree. That overlay tree is implemented in view of network constraints, and on the users and on their communication constraints. The middleware provides user index identifiers that inform the application that specific users have communication interests in specific parts of the application space. To send data to users that are interested in a specific part of the application space the application sends that data with a list of user index identifiers. The middleware then associates the user index identifiers with individual users and routes sent data to the individual users along the overlay tree.

13 Claims, 7 Drawing Sheets

OTHER PUBLICATIONS

El-Sayed, et al., "A Survey of Proposals for an Alternative Group Communication Service," IEEE Network, Jan./Feb. 2003, 2-7.

Jain, et al., "Data Clustering: A Review," ACM Computing Surveys, 31 (3), Sep. 1999, 264-323.

Krishnamurthy, et al., "On Network-Aware Clustering of Web Clients," SigCOMM 2000.

Liebeherr, et al, "Application-Layer Multicasting with Delaunay Triangulation Overlays," IEEE GLOBECOM '01, Nov. 2001.

Morse, et al., "Interest Management in Large-Scale Vitual Environments," Presence, 9(1), Feb. 2000, 52-68.

Ng et al., "Predicting Internet Network Distance with Coordinates-Based Approaches", © 2000 IEEE, INFOCOM'02, New York, NY, Jun. 2002.

Popescu, et al., "Method and apparatus to Support Application And Network Awareness Of Collaborative Applications Using Multi-Type Attribute Clustering," U.S. Appl. No. 10/725,298, filed Dec. 1, 2003.

Popescu, et al., "Method and Apparatus for Providing Dynamic Group Management For Distributed Interactive Applications," U.S. Appl. No. 10/723,227, filed Nov. 26, 2003.

Ratnasamy, et al., "A Scalable Content-Addressable Network," Proc ACM SIGCOMM '01, Aug. 27-31, 2001 ,San Diego, CA 161-172.

Riabov, et al., "Clustering Algorithms for Content-Based Publication-Subscription System," Proc. $22^{nd}$ Intl Conf Distributed Computing Systems (ISCDCS'02), 1-10.

Stoica, et al., "Internet Indirection Infrastructure," SIGCOMM '02 Pittsburgh, PA, USA © 2002.

Stoica, et al., "Chord, A Scalable Peer-to-peer Loolup Service for Internet Applications," Proc of ACM SIGCOMM '01, Aug. 27-31, 2001, San Diego, CA 149-160.

Wong, et al., "An Evaluation of Preference Clustering in Large-Scale Multicast Applications," IEEE INFOCOM 2000, Tel Aviv, 451-260.

English Abstract from Corresponding EP Application, EP0961452.

* cited by examiner

METHOD AND APPARATUS FOR VIRTUALIZING NETWORK RESOURCES

BACKGROUND OF THE INVENTION

1. Field of the Invention

Embodiments of the present invention generally relate to network communications. More specifically, embodiments of the present invention relate to managing communications between application servers and users using middleware.

2. Description of the Related Art

Large scale collaborative systems, e.g., grid computing, represent a growing class of distributed computing systems that enable users to dynamically and virtually share applications, data, and computational resources. The essence of a collaborative system is the virtualization of computing to enable users to obtain a high level of computing power at low cost. Applications that take advantage of distributed computing systems have been and currently are being developed by academic and commercial organizations.

Many distributed computing applications are subject to service level agreements (SLA) having quality of service (QoS) requirements. It is thus necessary for an application that is subject to such SLA agreements to implement resource allocation strategies to meet the QoS constraints. For example, it may be desirable to route communications through network servers that are closest to individual users in terms of round trip time. It may also be desirable to provide different network server allocation strategies based on user class and application types. Meeting such constraints can require complex communication networks and effective communication management.

Current state of the art communication management is usually based on implementing an application-specific network layer mechanism. Such network layer mechanisms are often difficult, costly, and time-consuming to implement and maintain. This is despite the fact that there are numerous similarities in the communication primitives of many application-specific network layer mechanisms. Even when application-specific network layer mechanisms are implemented, most do not take into account the actual network conditions that can and do impact communications.

Therefore, there is a need for a communication solution that manages the communication requirements while accounting for the resource conditions. A communication solution that takes into account actual network conditions would be particularly helpful. A communication solution that relieves applications from the task of explicitly handling all communication requirements would be especially useful.

SUMMARY OF THE INVENTION

In one embodiment, the principles of the present invention generally provide for middleware communication solutions that manage communications for collaborative applications such that the applications are relieved of the task of explicitly handling communications. Such middleware communication solutions use multiple attributes, such as network conditions, application logic, and application server resources, to establish network communications and to handle heterogeneity in service level agreement (SLA) requirements among applications and users.

An embodiment of the present invention obtains attribute information regarding such features as middleware resources; network resources such as application servers, network servers, node capacities, round trip travel times and other network factors; and users and their communication constraints (such as SLA/QoS requirements). Based on the attribute information, the middleware indexes the application resources (servers) to reflect their position in the attribute space. When users contact the middleware, the middleware indexes those users to reflect their individual interests in the parts of the application space that match their requirements. The middleware then facilitates communications between the application resources (servers) and the users via a hierarchical control structure that implements a communication overlay tree between the application resources and the individual users. That overlay tree is implemented in view of network constraints, such as the network node forwarding capacity and round trip travel times, and on the users and on their communication constraints. The middleware provides to the application, via application servers that are selected using the communication overlay tree, user index identifiers. Those identifiers inform the application that specific users (identified only by index identifiers) have communication interests in specific parts of the application space. When the application wants to send data to users that are interested in a specific part of the application space, the application sends that data, via the application resources that were provided with the user's index identifiers, and a list of user index identifiers of the users having interest in that part of the application space. The middleware associates the user index identifiers with individual users and routes the sent data to the individual users along the communication overlay tree.

In an embodiment of the present invention, if a significant change in the attributes that impact a user occurs then that user is remapped into the communication overlay tree.

An embodiment of the present invention makes use of application program interfaces (API) for communications with the middleware.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

Figure 1:
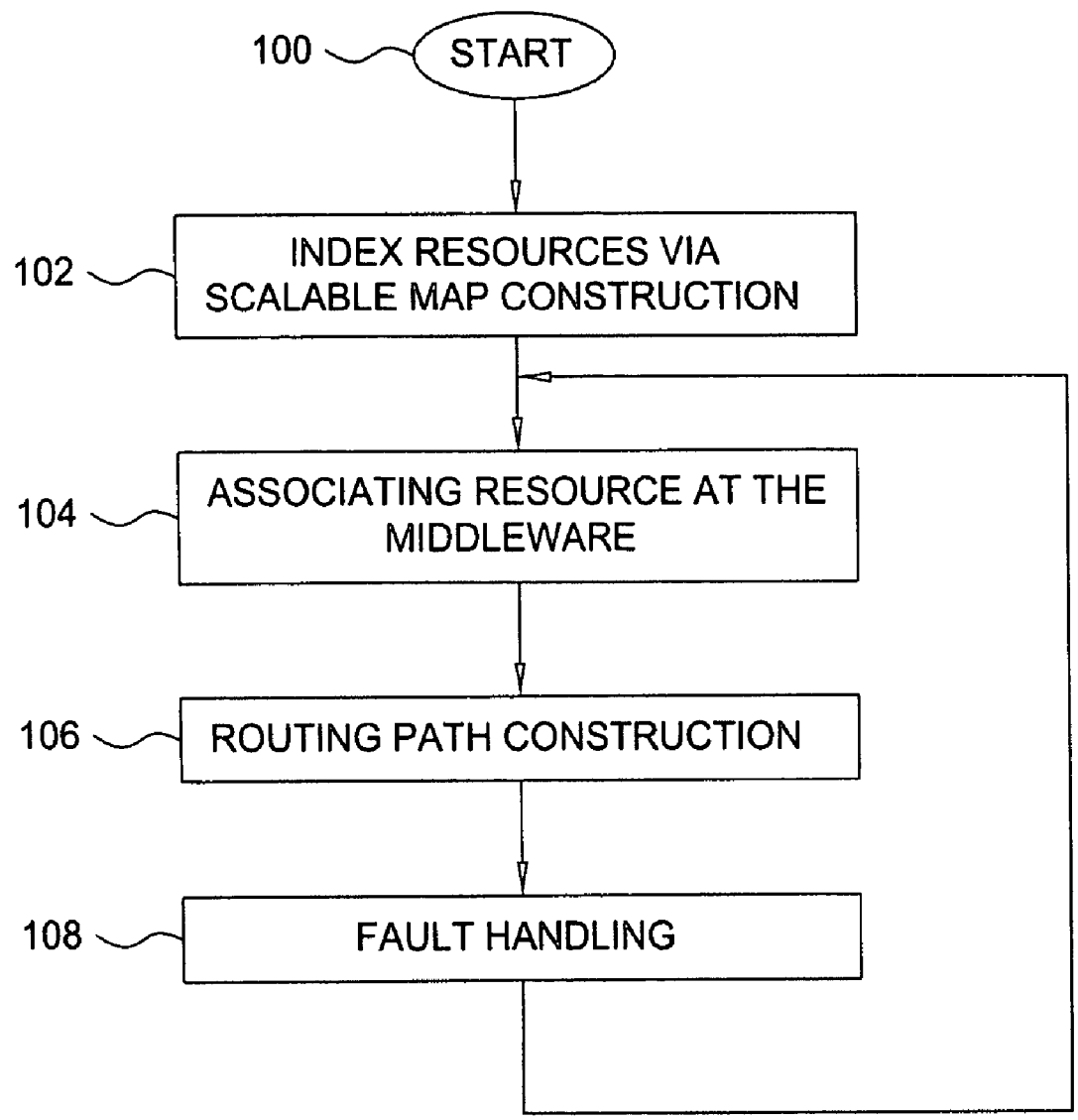
FIG. 1 illustrates a flow chart of virtualizing a communication network in accord with the principles of the present invention.

The present invention routes information from collaborative applications to application users using communication middleware that virtualizes a communication network. Referring now to FIG. 1, the virtualization process starts at step 100, and proceeds at step 102 by indexing of resources via scalable map construction. This is followed in sequence by a step 104 of associating the resources at the middleware, a step 106 of routing path construction, and a step 108 of handlings fault using soft state protocols. FIG. 1 shows the virtualization process as being continuous by looping back to step 104 to reflect possible re-associating of resources at the middleware.

Figure 2:
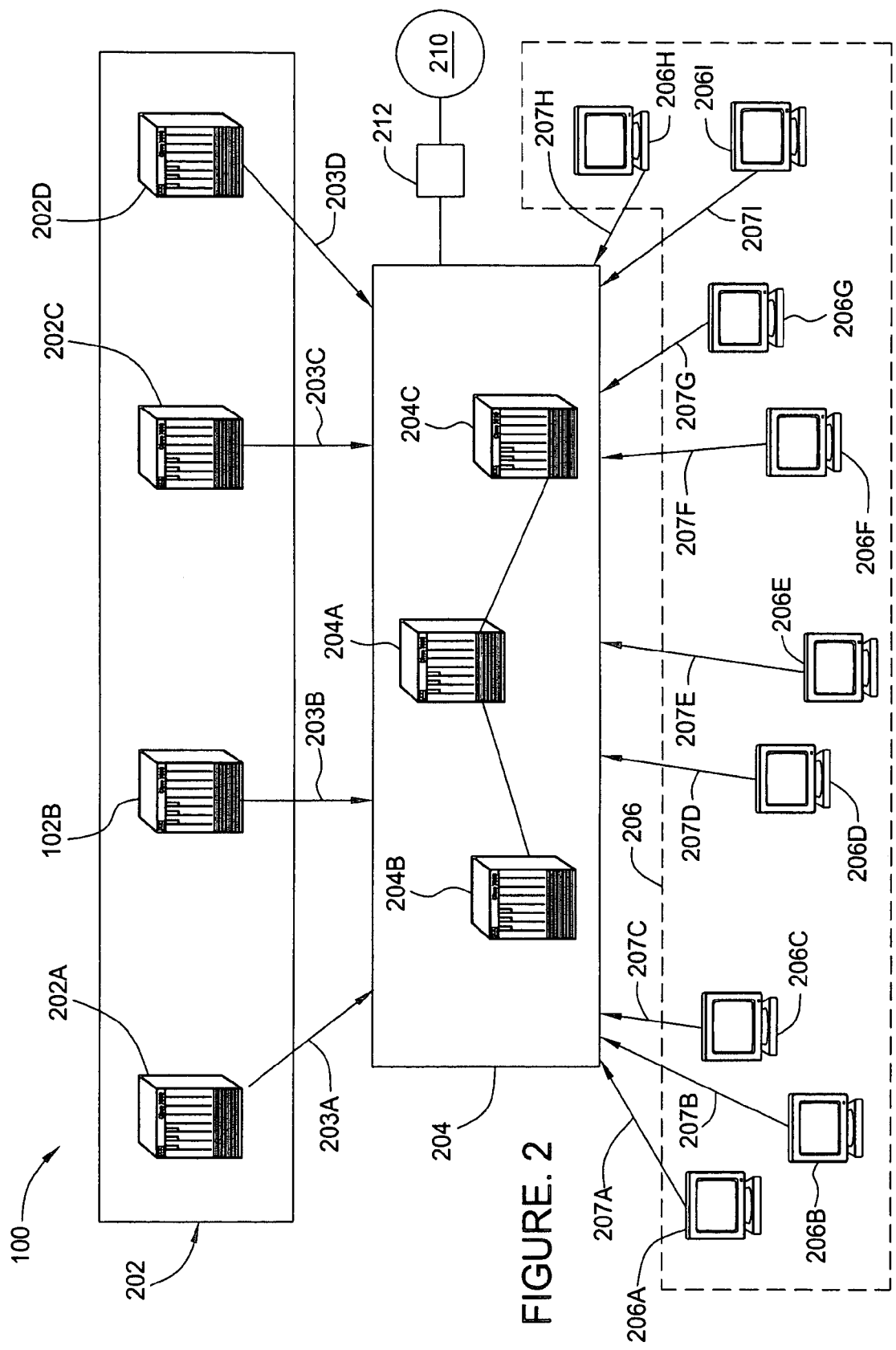
FIG. 2 illustrates a communication network and its resources.

The virtualization process is performed in the context of a communication network 200 that is illustrated in FIG. 2 and that is in accord with the principles of the present invention. The network includes an application 202 that runs on one or more application servers 202A, 202B, 202C, and 202D. The application servers connect via network links 203A, 203B, 203C, and 203D, to middleware 204. The middleware may include middleware servers 204A, 204B, and 204C that communicated with users 206A-206I. The application servers, middleware servers, and users 206A-206I can be geographically distributed. The middleware servers 204A, 204B, and 204C connect to the 206A-206I via links 207A-207I. Additionally, the middleware servers can connect to users, application resources, other middleware servers, or any other type of network node 210 via a network server 212.

The application servers (202A-202D) run one or more instantiations of the application 202 (or multiple applications) that are used by the users 206A-206I. The middleware 204, via its middleware servers 204A-204C, manages the network communications based on multiple attributes that are subsequently described. The middleware 204 implements communications between the application servers (202A-202D) and the users 206A-206I and network node 210 via a hierarchical control structure that establishes a communication overlay tree that spans between the application resources, the individual users 206A-206I, and the network node 210, and through a middleware server 204A-204C. For example, the middleware can associate an applications server (202A-202D) with a middleware server (204A-204C) and with a particular user (206A-206I) such that communications between that application server and that user through that middleware server has the shortest round trip travel time. In another example, the middleware servers 204A-204C can provide different application server-to-user allocation strategies based on user classes and application types.

To accomplish the step 102 of indexing of resources via scalable map construction, the middleware 204 is provided with attribute information such that the entire network space can be portioned into a set of regions. That network space includes the: middleware servers 204A-204C (in general, middleware resources); network resources such as the application servers (202A-202D), network servers, node capacities, round trip travel times and other network constraints; and users and their communication constraints (such as QoS). Based on that information, at step 102 the middleware associates resources by forming partitions based on a metric, such as network delay, that is specified by the application and/or users.

For example, it may be desirable to partition a network space based on AS (autonomous system) prefixes that are assigned to different network domains. In such an indexing scheme, all of the AS prefixes are gathered and then a desired set of bins are created, with each bin being assigned a partition of the prefix sets. Based on the closet prefix matching, bin j may be assigned all of the prefixes 192.X.X.X and 200.X.X.X. Next, each bin is assigned a representative server/controller—this server/controller may either be a physical or a logical one. This assignment is done based on a desired metric, say, closet match in the prefix set to the IP address of the server. If server(i) is assigned to bin(j), the assignment might be that server(i) would be managing the network space partition defined by bin(j). In summary, each bin would be assigned an index space for the server to allocate its managed users an ID reflecting this association of virtual space. It should be understood that this portioning example is merely a suggested one and should not be understood as restricting the indexing space in any way. Indexing can be based on metrics that are gathered via active and/or passive monitoring.

Note that the above example illustrates one possible approach for defining the network map and associating a set of servers to each part of the network space. A network map construction need not be passive. For example, it is possible to construct a map using measured network delays and then creating a set of partitions or regions that are close to each other in terms of network delay. For facilitating such a measurement based map construction, an external measurement infrastructure, such as landmark based measurement, may be used. Reference, for example, T. S. Eugene Ng and Hui Zhang, "Predicting Internet Network Distance with Coordinates-Based Approaches," INFOCOM'02, New York, N.Y., June 2002.

The looping in FIG. 1 reflects the fact that a severe change in the attributes that are used for the initial indexing may require repartitioning of the assigned space. It is assumed that that will be rare event that happens over a very large time scale. The simple solution is to recompute the partitioning and reassignment of the indexing. As an example, consider the previous illustration of fixed binning based on AS prefixes. Assume an AS prefix in bin i is found to be closer to prefixes in bin j in terms of network delay due to changes in the network conditions. In this case, the chosen prefix is assigned to bin j. Due to this reassignment; there would be a change in the assignment of IDs to the users that belonged to the chosen AS prefix. This reassignment requires notification to the application servers and changing the association information that is maintained in the middleware servers. Consider for example that subnet described by prefix 9.2.X.X earlier, belonged to bin(i). Due to changes in the network conditions, later it was found that 9.2.X.X is closer to subnets managed by bin (j) as 9.2.X.X become closer to 11.x.x.x that was in bin(j). In this case, the partitioning is adjusted to meet the new partitioning conditions. Thus the space that was managed by 9.2.x.x now would belong to bin(j). As a result of this reclustering process, a new representative may be chosen for this bin. Once updated reassignment of the ID that are managed earlier by this bin(j) may be performed to reflect this change. Thus the indexing would change to reflect this adaptation process.

FIG. 2 illustrates servers (202A-202D) that are indexed to reflect their position in an attribute space. When users (206A-206I) contact the middleware 204, the middleware indexes those users to reflect their individual interests in the parts of an application space that match their requirements. The middleware 204 can then implement a communication overlay tree in view of network constraints, such as the network node forwarding capacity and round trip travel times, on the users, on their communication constraints, and on application resources.

When a user intends to use an application server (202A-202D), its request is redirected to a middleware server (204A-204C). Based on its requirements and its positioning in the application attribute space, an appropriate cluster is determined for the association with the virtual space. Once this choice is made, a virtual ID is assigned to the user in such a way that it reflects its association with this cluster. One simple indexing would be to add the cluster ID to the IP address of the user as a prefix to derive its virtual ID. The application server would then be informed about this user by announcing the user's virtual ID to the server.

As an example, consider a user that wants the nearest server in terms of network delay. In such case, the user is assigned a virtual ID from the ID space managed by the server that is closest to the user in terms of network delay. In other words, an index is assigned this user from the index space assigned to the virtual space managed by that server. This assigned ID reflects the association of the user with this server. One possible approach is to add the server ID as the prefix to the IP address of the user to generate the ID for the user. Given this attribute aware indexing, an appropriate server is assigned for this user. Appropriate control messages are sent to this chosen server to communicate the request from the user using the user's assigned virtual ID.

Figure 3:
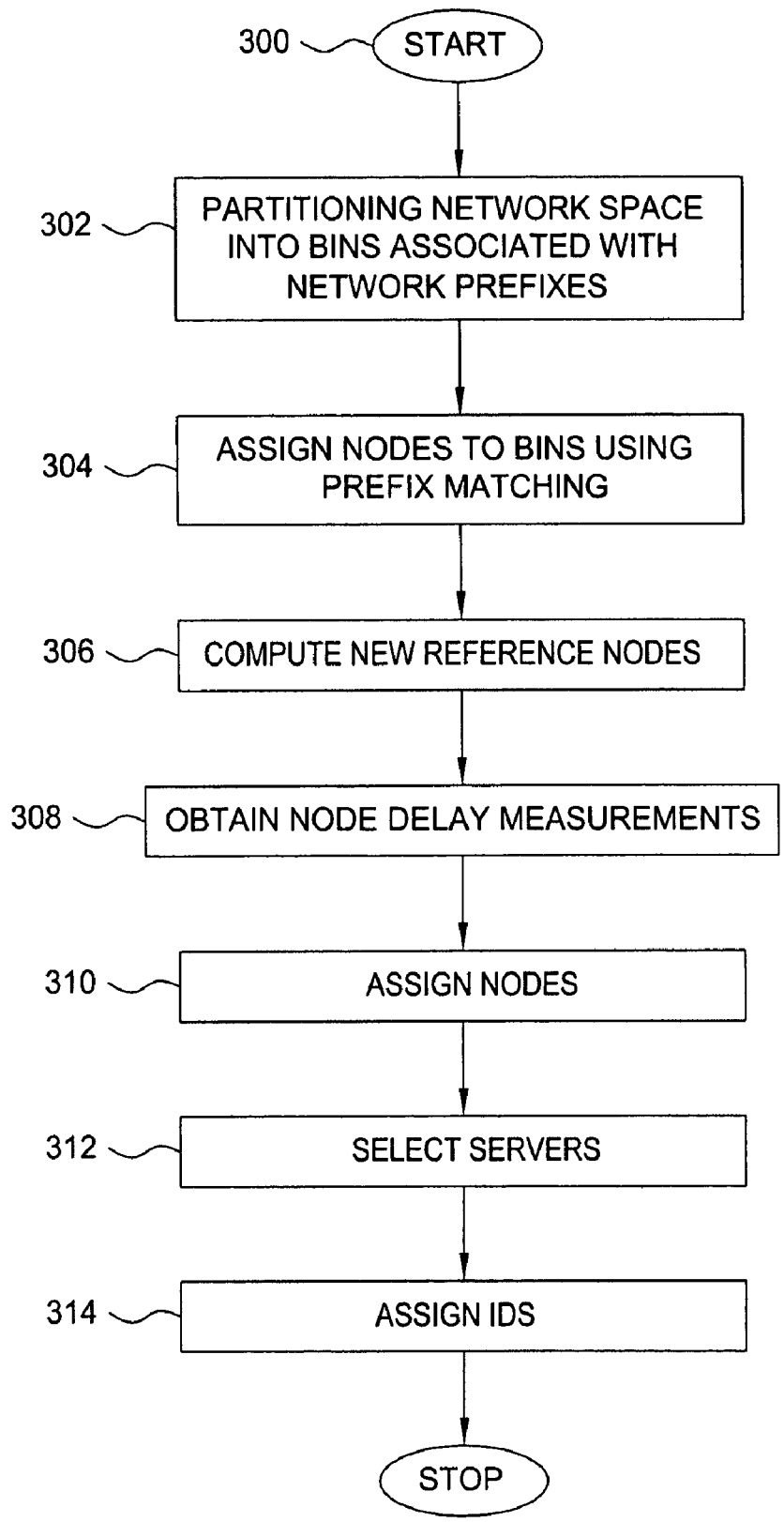
FIG. 3 illustrates a method of assigning IDs.

FIG. 3 illustrates the steps of creating virtual ID assignments. The process begins at step 300 and proceeds in the network attribute space at step 302 by partitioning a network space into bins associated with the network prefixes: e.g. bin(i)->9.2.10.xxx. Then, at step 304 nodes are assigned to bins using prefix matching. Then, at step 306 new reference nodes are computed in bin (j) for network delay positioning (the set of delay positioning servers change as nodes are added and removed from the bin). At step 308 node delay measurements are obtained.

With the node delay measurements available, at step 310, in the communication interest space nodes are assigned to the communication groups that overlap with their communication interest. Then, at step 312, servers nodes that map to the communication group are selected. Then, at step 314, node virtual IDs are assigned based on the network bin assignment, delay measurement and the ID of the selected server node. The process then stops at step 316.

The step 104 of associating resources at the middleware also includes maintaining the association of indexes with the actual IP address of every user in the middleware server. The middleware server that keeps this association information is determined according to the control hierarchy that manages the set of middleware servers or policies that are in place for sharing the management load. Middleware server control protocol may decide to replicate this information at other middleware servers. The user is returned a descriptor that reflects the middleware server that it should contact for further communication within the application space. Provisions are made to hide the mapping of real identities (IP addresses etc.) to the virtual IDs within the middleware server.

Figure 4:
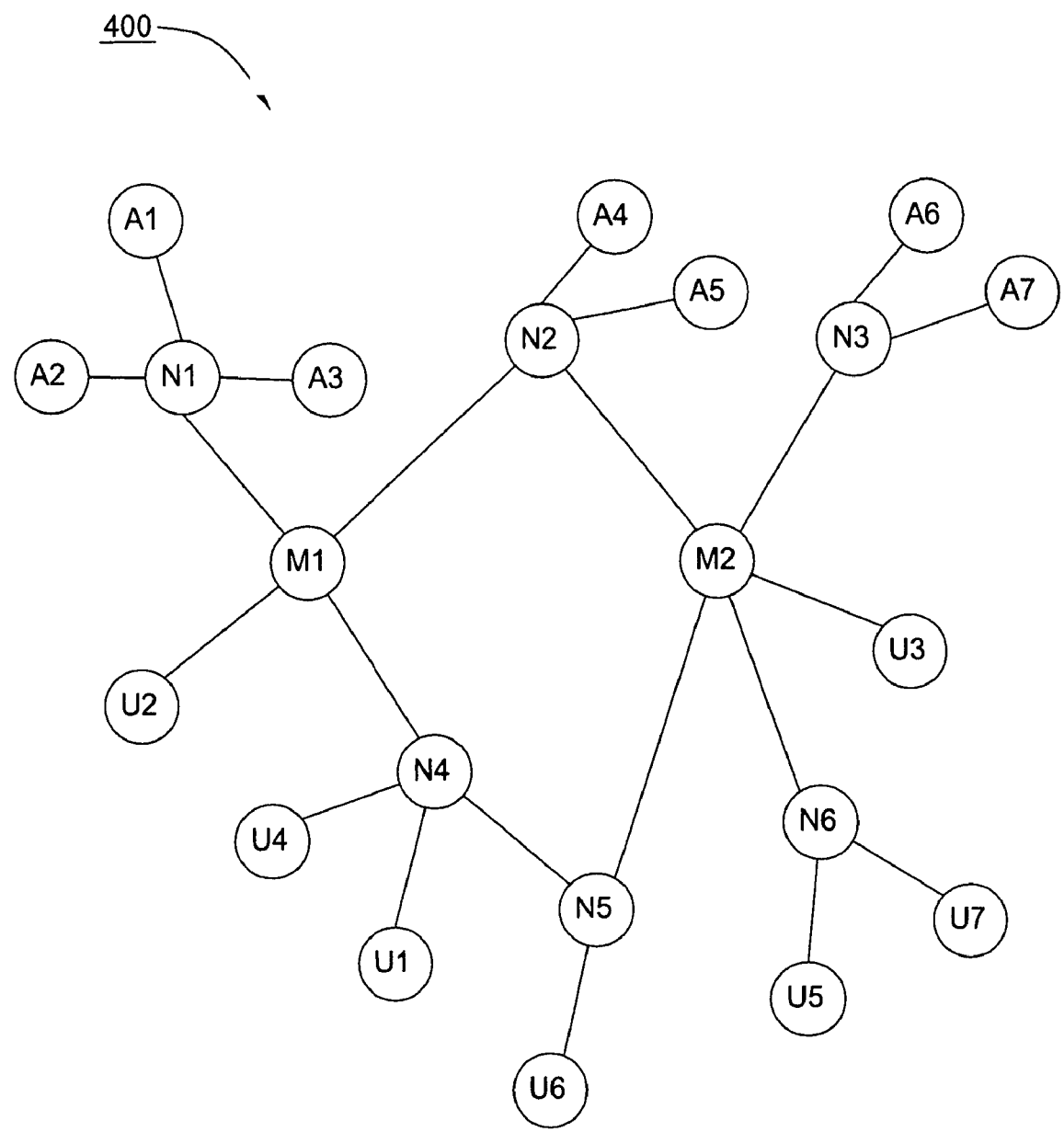
FIG. 4 illustrates a communication overlay tree.

The step 106 of constructing a routing path typically takes the form of creating a communication overlay tree. FIG. 4 illustrates an example of a communication overlay tree 400 for communications between application resources A1-A7 and users U1-U7 via middleware M1-M2 and nodes N1-N6. As shown, node N1 clusters A1-A3 together and routes communications through M1, node N2 clusters A4-A5 together and routes communications through both M1 and M2, while node N3 clusters A6-A7 together and routes communications through M2. Further, node N4 links U1, U4, and N5 together. Node N5 also connects to M2 and to U6. M2 also connects directly to U3 and to node N6, which in turn links U5 and U7. Thus, A1 can send data to M1 via node N1, and M1 can route that data to N4 to U1. It should be understood that the overlay tree 200 is configured by the middleware based on multiple attributes.

While we present on method of tree building, others exist. Reference, for example, "Enabling Conferencing Applications on the Internet using an Overlay Multicast Architecture", Yang-hua Chu, Sanjay G. Rao, Srinivasan, Seshan and Hui Zhang, Proceedings of ACM SIGCOMM, San Diego, Calif., August 2001; "A Case For End System Multicast", Yang-hua Chu, Sanjay G. Rao and Hui Zhang, Proceedings of ACM SIGMETRICS, Santa Clara, Calif., June 2000, pp 1-12; and "Scalable Application Layer Multicast," Suman Banerjee, Bobby Bhattacharjee, Christopher Kommareddy, ACM Sigcomm, August 2002.

The set of users that are to be notified for any event depends on the application logic and on the session management module. The application uses application programming interfaces (APIs) to communicate with to the middleware server or through a session management module. Given a notification event and a set of users, a middleware server determines the actual identity of the users that have to be contacted. Using this lookup information, appropriate users are notified by constructing an efficient data path overlay connecting these nodes. Two types of overlays that may be used include a common overlay that is independent of the session and a per-session overlay that depends on the session. While a common overlay is simple to construct, it may not be the most efficient in terms of bandwidth usage and latency. Thus, in some applications a specific per-session overlay path is useful.

Figure 5:
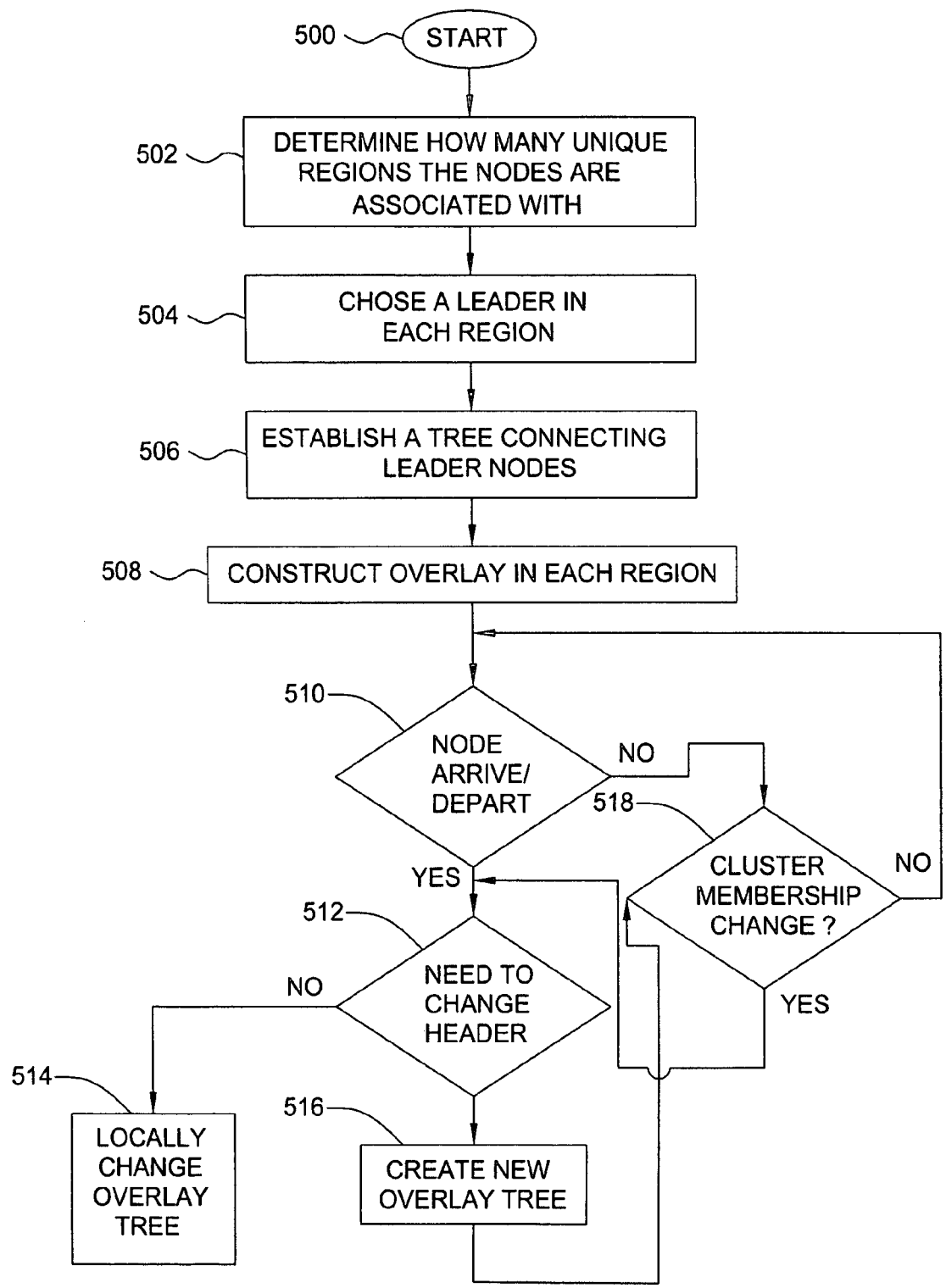
FIG. 5 illustrates a flow chart of the operation of creating and maintaining an overlay tree.

FIG. 5 illustrates a method 500 of constructing a specific per session overlay path using virtual IDs and a hierarchical approach. The method 500 starts at step 502 and proceeds with determining how many unique regions the nodes are associated with. At step 504 an overlay path is established to connect to those regions by picking a leader in each of these regions. The leader in each region could be an arbitrary node in a region or it could be made based on an informed choice. Once the leaders in each region are picked, at step 506 a tree connecting leader nodes is established by taking into account relative distances in the network space (which should be available from established metrics). If such information is not available, a virtual ID can be used for each cluster to determine a tree such that delays along each tree path is minimized. Next, at step 508 an overlay in each region is constructed from each cluster leader node to the rest of the nodes in that cluster. If detailed information is available, a SLA specific overlay is constructed such that SLAs are met. If such information is not available, a tree building algorithm can be used to connect all of the nodes in that cluster that are part of the session.

Under some conditions there may be a need to adapt the overlay path. First, if nodes arrival or departure in a session, or if there is a change in the network condition that changes the clustering/partitioning of the network and communication space. At step 510 a query is made as to whether a node arrives or departs. If so, at step 512 a determination is made if there is a need to change the leader node. If not changed, at step 514 local changes are made to the overlay tree. However, if there is a need to a change the leader node (for example, the leader node departed), at step 516 new overlay tree is created. This change is propagated to the upper hierarchy so that inter-cluster path is established as well.

If a node has not arrived or departed, at step 518 a query is made as to whether a change in network and/or communication interests the membership within a cluster has changed. If so, a jump to step 512 is made to determine if a leadership change is required. Steps 514 and 516 are then run appropriately. If not, a loop is made back to determine if a node has arrived or departed. In this manner, changes to the network are monitored and the network is corrected appropriately.

Figure 6:
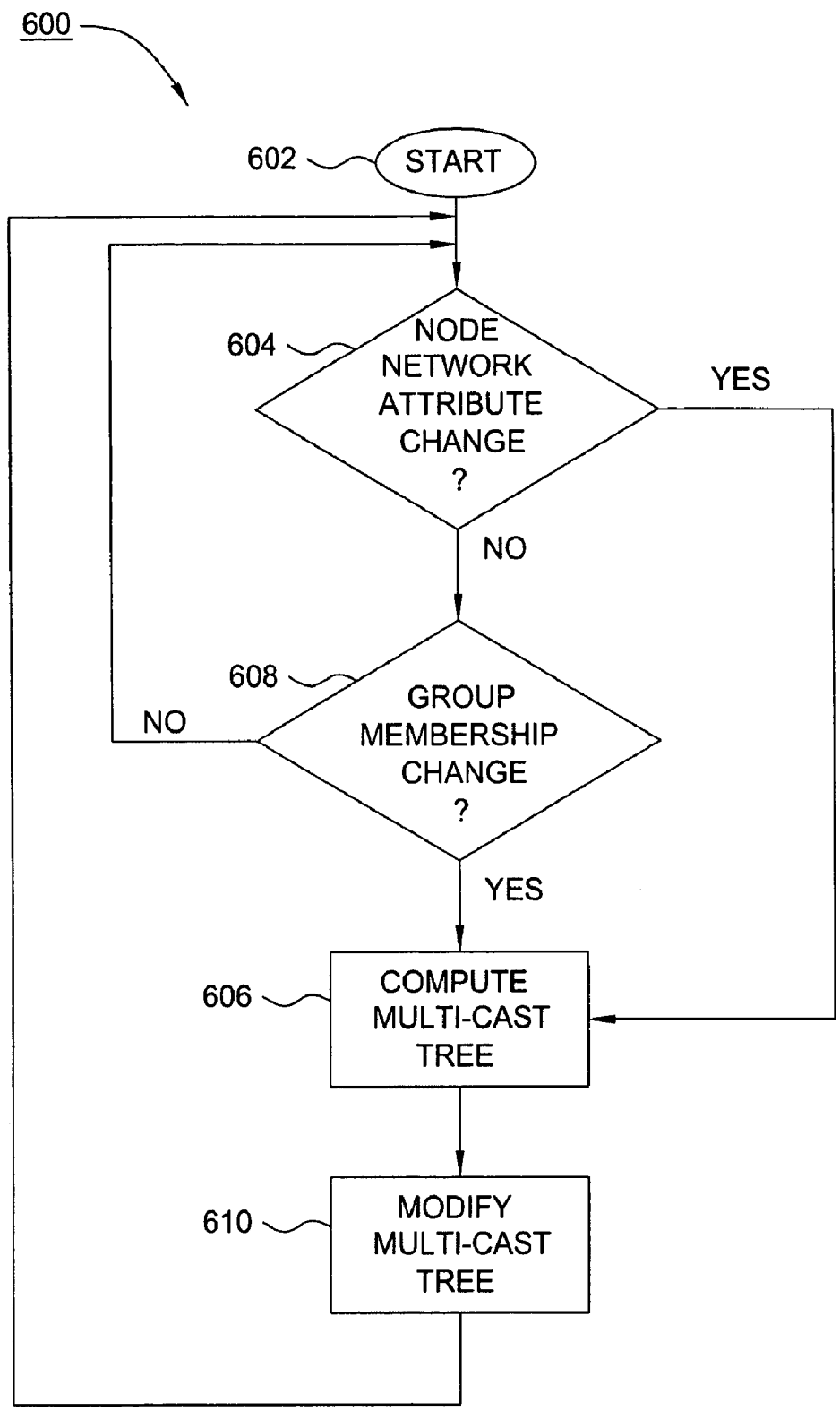
FIG. 6 illustrates a flow chart of a method of creating and modifying a multi-cast tree.

The constructed overlay tree is adaptive to changes in node network attributes and group membership. An adaptive method is shown in FIG. 6. That method starts at step 602 and proceeds at step 604 by determining if a node network attribute has changed. If so, a jump is made to a step 606 (which is discussed subsequently). However, if at step 604 the determination was that a node network attribute has not changed the method 600 proceeds to a step 608 where a determination is made as to whether the group membership has changed. If not, a loop is made back to step 604. In this manner a continuous monitoring for changes that impact the constructed overlay tree is performed. If a node network attribute has changed (at step 604), or if the group membership has changed, (at step 608), at step 606 a multi-cast tree is (re) computed. Then, at step 610, based on the computed multi-cast tree the prior multi-cast tree is modified.

The forgoing is performed within the network shown in FIG. 2. The middleware 204 provides to the application 202, via application servers 202A-202D, user index identifiers. The application server that is supplied with a particular user index identifier is selected from the communication overlay tree 200. The user index identifiers inform the application 202 that specific users, which are identified only by index identifiers, have communication interests in specific parts of the application space. Thus, the application 202 becomes aware that a user (206A-206I) has an interest in a specific part of the application, and that communications have been initiated via a particular middleware server (204A-204C) through a particular application server (202A-202D). However, the application 202 does not know the identity of the user or the position of that user in the communication overlay tree 200.

Based on the application's logic and session information, when the application 202 determines that it should send data to users that are interested in a specific part of the application space, the application 202 sends that data, via the application server (202A-202D) that was provided with the users index identifiers, together with a list of user index identifiers of the users having interest in that part of the application space. The middleware 204 then associates the user index identifiers with individual users (206A-206I) and routes the sent data to the individual users (206A-206I) along the communication overlay tree 200.

Since the middleware 204 manages communications between the users (206A-206I) and the application 202 over a network having nodes, to run efficiently the communication network 200 should operate according to specific communication protocols and should support the communication overlay tree 200. Communication protocols are established by providing application developers with application programming interfaces (APIs) for interfacing applications 202 and users (206A-206I) with the middleware 204 software. The APIs implement appropriate and standardized communication primitives that enable application developers to develop applications 202 such that the users 206A-16I can interface through the middleware 204 to an application 202 running on an application server 202A-202D.

Supporting the communication overlay tree requires implementing steps that are related to tree construction and to tree use. FIG. 3 illustrates a method 300 of supporting the communication overlay tree. That method begins at step 301 and proceeds at step 302 by indexing network resources using a scalable map. That scalable map identifies application servers (202A-202D) and resources, middleware servers (204A-204C), network nodes (210), and various network communication parameters such as node forwarding capacity, round trip time delays between nodes, packet loss rates, and other network constraints. Thus, the mapping represents data gathering regarding the network environment that the overlay tree 200 is to operate in. It should be understood that step 302 is ongoing in that the network environment is dynamic. Any noticeable change in SLA or in a condition that affects a user's perceived SLA can initiate a new indexing of the network resources.

FIG. 2 application servers A1-A3 are clustered to communicate via node N1. Clustering can be performed for a given set of application servers 202A-202D, links 203, nodes 212, and middleware servers 204 to form a virtual space. For example, a Euclidean space may be used to partition the application servers into clusters, which are then indexed using an appropriate number of cluster bits in a vector structure. Next, for each cluster an index is formed to refer to a particular application server. Such a clustering approach enables removal and addition of application servers 202A-202D. Note that the actual attributes that are used to create this index may depend upon the limitations and requirements of an application, of the application servers 202A-202D, of the links 203, and of the middleware servers 204A-204C. Again, clustering is an ongoing process in which a severe change in the network can initiate new clustering. A severe change is any network change that impacts the ability of the network to support the requirements of the user and/or the application servers. Severe changes should be a rare event that only happens over a large time scale. But, if a severe change is detected the network resource indexing of step 302 can be determined anew, followed by clustering at step 303. Alternatively, an incremental approach that tries not to disturb the originally assigned network resource indexing can be implemented.

After the network resources are clustered at step 303, at step 304 the users are indexed. When a user enters the communication network 200, the user's requirements and interests are input to a middleware server 204A-204C, and thus to the middleware 204. Requirements and interests can be sent as user vectors in which various bits represent pre-assigned features. Then, at step 306, based on the user requirements, user interests, the position of the user in the application attribute space, and network resources between the user and a middleware server, the middleware determines an appropriate application server cluster for the user. For example, this association may reflect the nearest application server to the user based on time or based on acceptable packet data losses. Based on the indexing method that is used, at step 308 the user is assigned an index identifier that is passed to the application 202 via an appropriate application server 202A-202D and that is sent back to the user. The index identifier informs the application 202 that a user 206A-206I is interested in a specific part of the application space and that communications are to go through a particular application server 202A-202D to a particular middleware server 204A-204C. The user is also returned a communication descriptor that identifies the middleware server 204A-204C that it should contact for further communications within the application space.

However, the middleware 204 tracks the actual user and its location within the communication overlay tree 200, such as by indexing the user's IP address along with the user index identifier. The actual middleware server 204A-204C that keeps this association information is determined according to a middleware control hierarchy that manages the middleware servers. In addition, middleware server control protocols may decide to replicate this information in one or more of the other middleware servers.

Following step 308, at step 310 the application logic and/or a session management module of an application determines a list of users 206A-206I that are to receive data based on the occurrence of a notification event. At step 312, when a notification event is detected, the application 202 sends data to the predetermined middleware server 204A-204C together with the list of users 206A-206I that are to receive data. At step 314 the middleware 204 then determines the actual identities (IP addresses) of the users 206A-206I that are to be contacted and then sends the data to those users. In practice, the application 202 or the session management module uses the provided APIs to describe the set of users to the appropriate middleware server 204A-204C.

Given that that association of users 206A-206I and application servers 202A-202D are maintained at the middleware servers 204A-204C, it is useful to support uninterrupted communication in the advent of middleware server failure. Step 108, fault handling, is achieved by two sets of mechanisms. The first one is to replicate the states at multiple middleware nodes besides the designated server. The second is to fail over to the backup server when it is detected that the parent server has failed. Several approaches can be used to detect the failure. For example, each user may use keep-alive messages to check for node failures. In the advent of node failures, alternate servers are contacted to re-establish the connection. Also in addition to node failures, it is possible to choose a backup server (or a freshly chosen server) if there is performance degradation.

Figure 7:
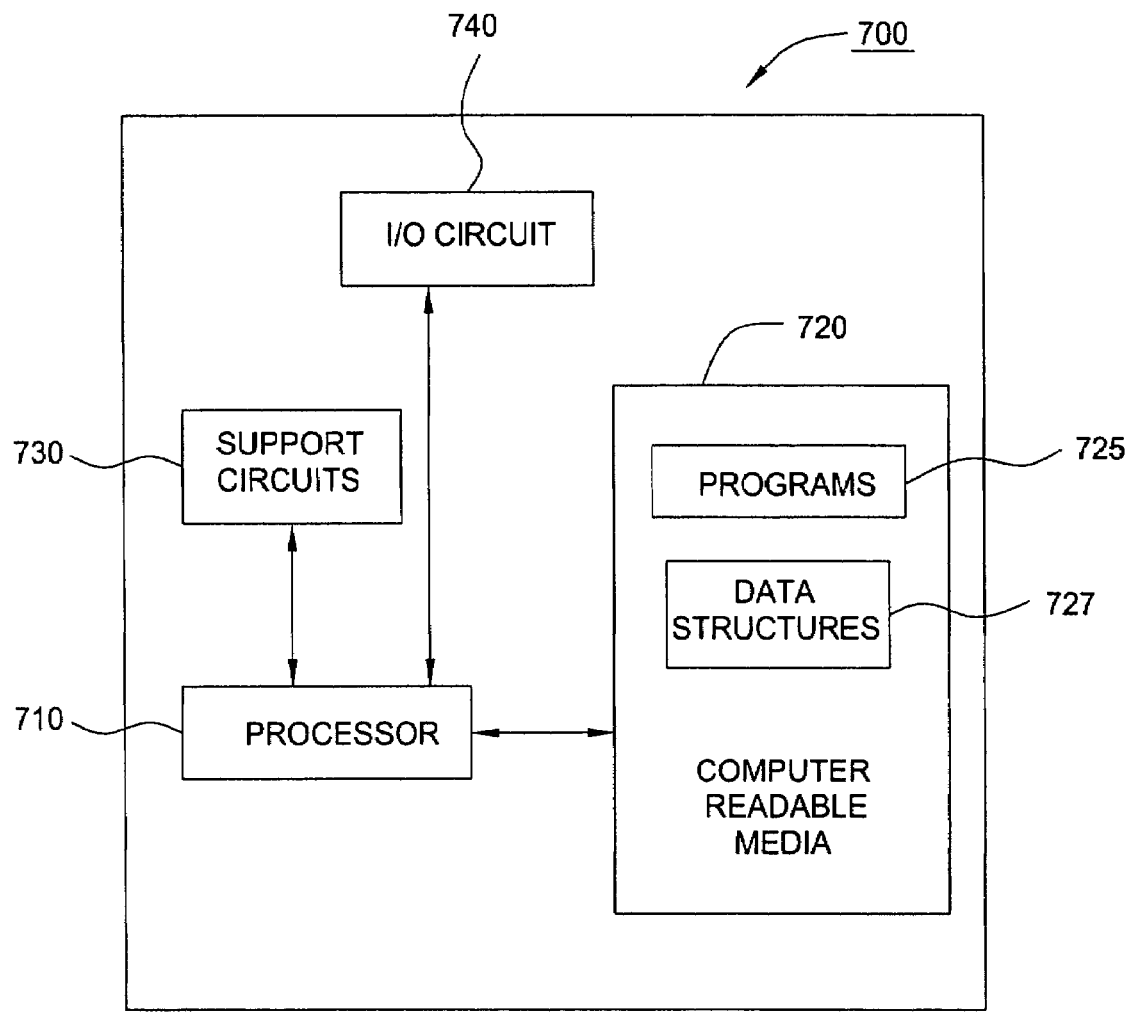
FIG. 7 illustrates a middleware server.

FIG. 7 depicts a high level block diagram of an embodiment of a middleware server 700. The middleware server 700 comprises a processor 710 as well as a computer readable media 720 for storing control programs 725 and data structures 727. The processor 710 cooperates with conventional support circuitry 730 such as power supplies, clock circuits, cache memory and the like as well as circuits that assist in executing the software routines stored in the memory 720. As such, it is contemplated that some of the process steps discussed herein as software processes may be implemented within hardware, for example, as circuitry that cooperates with the processor 710 to perform various steps. The middleware server 700 also contains input-output circuitry 740 that forms an interface between the various network components (e.g., hard drives, optical drives, and the like) communicating with the middleware server.

Although the middleware server 700 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof. Furthermore, the computer readable media 720 is a computer readable memory that stores information that can be run and/or accessed by the processor 710.

The foregoing results in a virtualized network in which communications are managed and handled by middleware that relieves the application and the user from having to explicitly communicate with each other and in which communications are based on the network conditions.

While the foregoing is directed to embodiments of the present invention, other and further embodiments of the invention may be devised without departing from the basic scope thereof, and the scope thereof is determined by the claims that follow.

The invention claimed is:

1. A method of providing communication support for collaborative applications comprising:
   abstracting a network and application server resources at a middleware level;
   indexing the application server resources in a network aware and application aware manner to reflect positions of the application server resources in an application space;
   indexing a plurality of users to reflect communication interests of the plurality of users in the application space; and
   forming a communication overlay tree that provides communication links between the application server resources and the plurality of users, via the middleware level, the communication overlay tree comprising a first set of one or more nodes representing the application server resources, a second set of one or more nodes representing the plurality of users, a third set of one or more nodes representing middleware residing at the middleware level, and a fourth set of one or more nodes for clustering said one or more nodes representing the application server resources into a first set of one or more groups and for clustering the one or more nodes representing the plurality of users into a second set of one or more groups different from the first set of one or more groups, such that communications from said first set of one or more groups or from said second set of one or more groups are routed via a single one of the communication links to one of the one or more nodes representing middleware.

2. A method of virtualizing network resources to support collaborative communications in a network having application servers and users that have communication interests, the method comprising the steps of:
   constructing a scalable network map;
   indexing the application servers according to positions of the application servers in the network;
   indexing the users according to communication interests of the users;
   generating a communication overlay tree based on the indexing of the application servers, on the indexing of the users, and on the scalable network map, the communication overlay tree comprising a first set of one or more nodes representing the application servers, a second set of one or more nodes representing the users, and a third set of one or more nodes for clustering said one or more nodes representing the application servers into a first set of one or more groups and for clustering the one or more nodes representing the users into a second set of one or more groups different from the first set of one or more groups, such that communications between said first set of one or more groups and said second set of one or more groups are routed via communication links; and
   supporting communications between the application servers and the users over the communication overlay tree.

3. The method of claim 2 wherein the scalable network map is further based on supporting service level agreements.

4. The method of claim 2 wherein supporting communications includes operating according to middleware software.

5. The method of claim 2 wherein generating a communication overlay tree is repeated upon changes to the network.

6. The method of claim 2 wherein indexing users includes indexing a new user to the network.

7. The method of claim 2 wherein an application server is indexed if it enters the network.

8. A method of operating a communication network, comprising the steps of:
   identifying a plurality of network resources and network constraints of the plurality of network resources;
   identifying a plurality of application servers that are controlled by an application having an application space;

identifying a plurality of users and a communication interest in the application space of each of said plurality of users; and indexing the plurality of application servers to reflect positions of the plurality of application servers in an attribute space;

indexing said plurality of users according to identified communication interests;

forming a user index identifier for each of said plurality of users; and establishing a communication overlay tree between the plurality of application servers and the plurality of users based on the network constraints and on the plurality of users as indexed, the communication overlay tree providing communication links between the plurality of application servers and the plurality of users, the communication overlay tree comprising a first set of one or more nodes representing the plurality of application servers, a second set of one or more nodes representing the plurality of users, and a third set of one or more nodes for clustering said one or more nodes representing the plurality of application servers into a first set of one or more groups and for clustering the one or more nodes representing the plurality of users into a second set of one or more groups different from the first set of one or more groups, such that communications between said first set of one or more groups and said second set of one or more groups are routed via the communication links.

9. The method of claim 8, further including indexing network locations of each user of said plurality of users.

10. The method of claim 9, further including providing an application with the user index identifier for each of said plurality of users via one of the plurality of application servers.

11. The method of claim 10, further including sending data from via one of the plurality of application servers to at least one user of said plurality of users based on the communication interest of the at least one user and on the user index identifier of the at least one user.

12. The method of claim 8 wherein indexing of the plurality of users includes indexing new users to the communication network.

13. The method of claim 8 wherein establishing the communication overlay tree is at least partially based on round trip travel times.

* * * * *